Feb. 3, 1953 E. R. KOPPEL ET AL 2,627,334
CONVEYER AND SHIFTER GUIDE MECHANISM
Filed Dec. 29, 1948 4 Sheets-Sheet 1
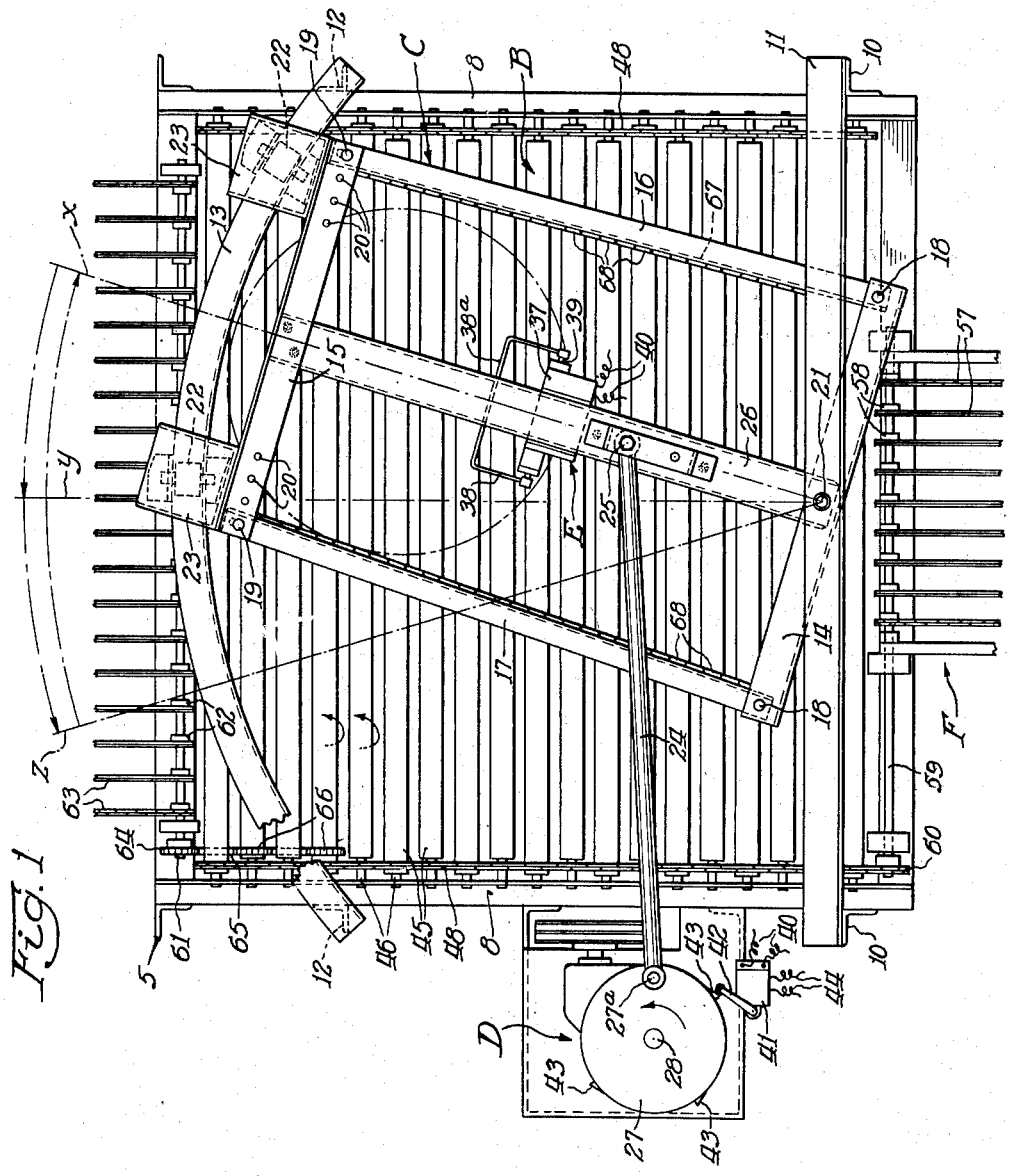
Inventors:
Ernst R. Koppel and
William J. Walters
By: Edward C. Gritzbaugh
Atty.

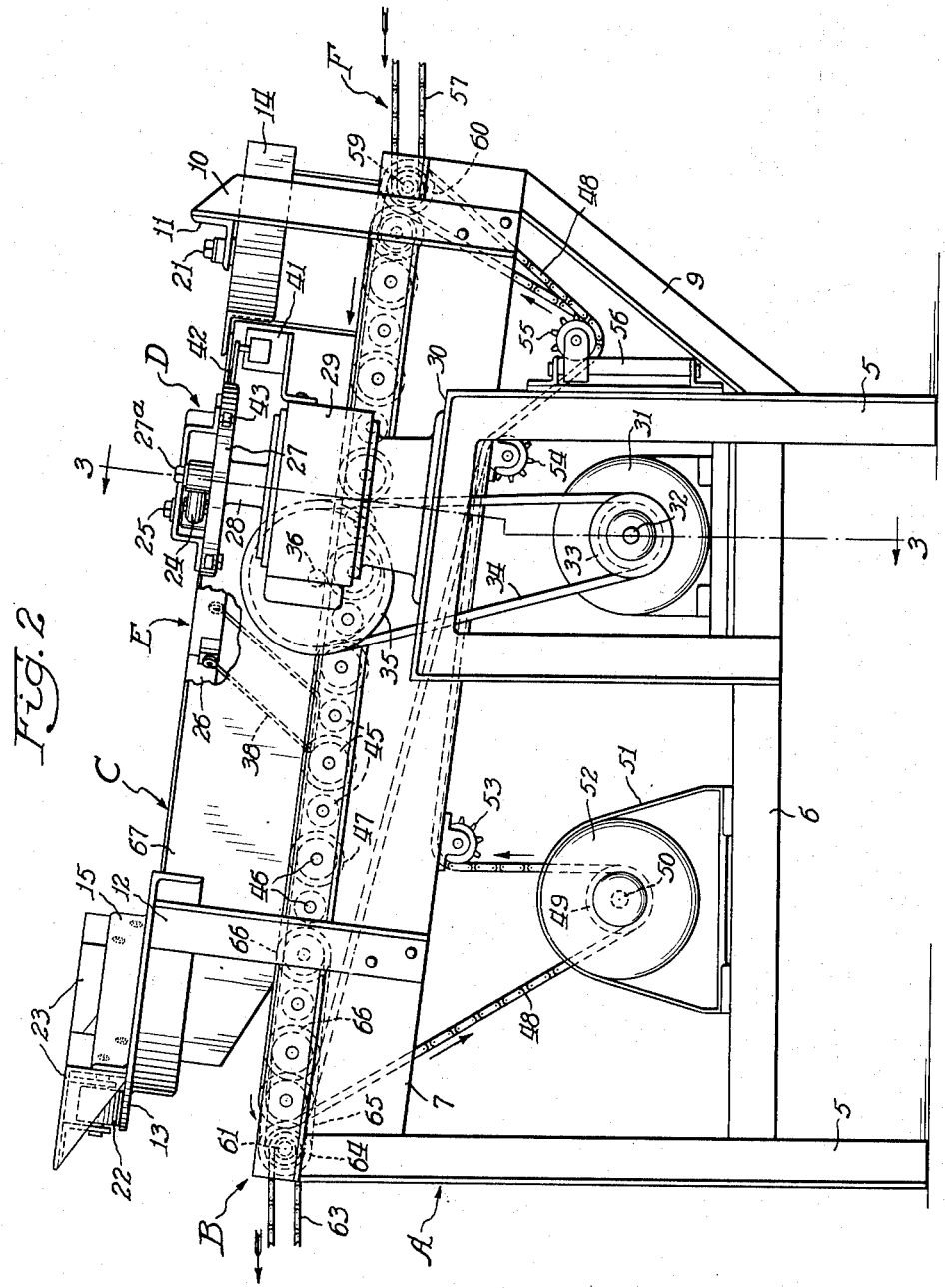

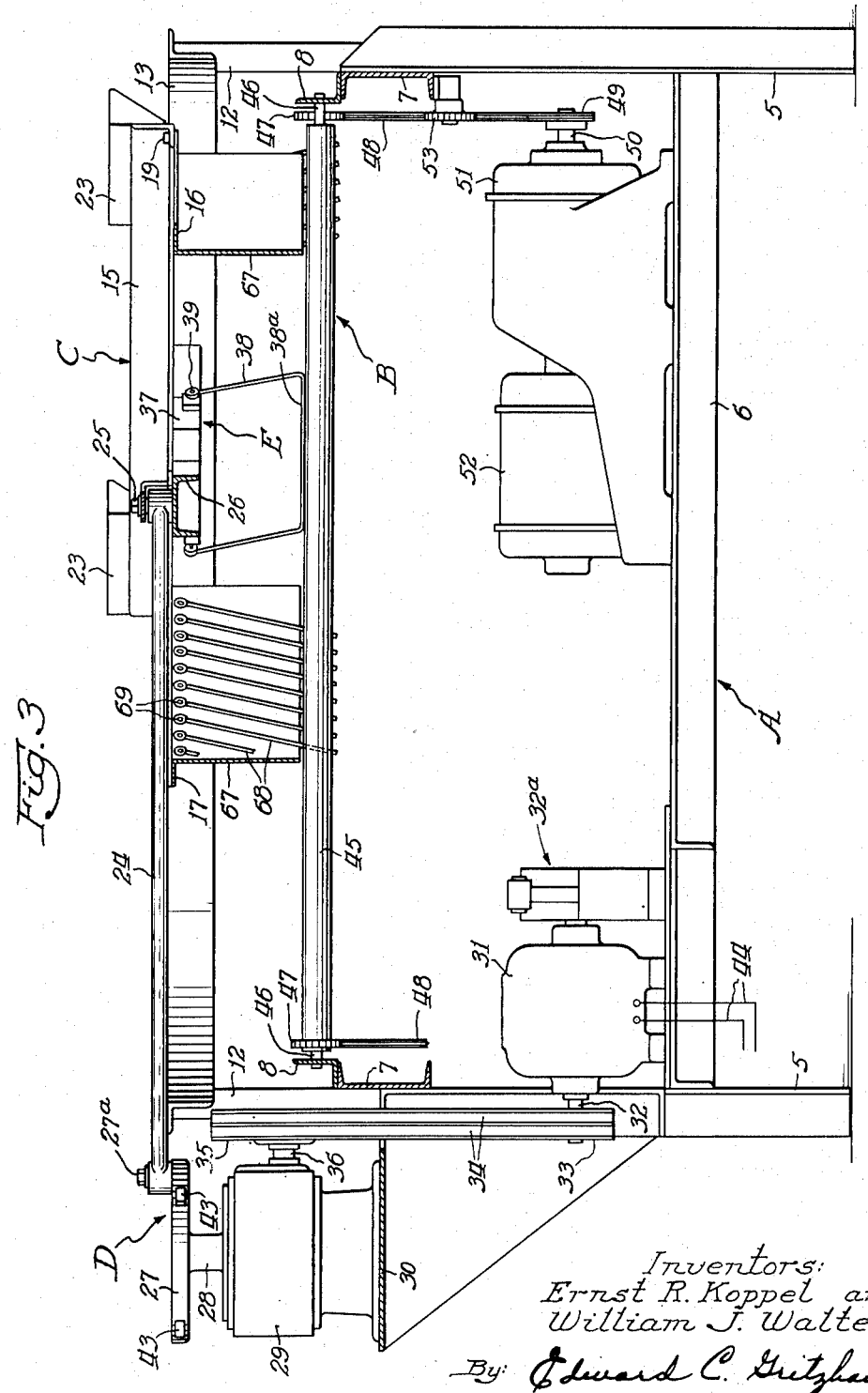

Feb. 3, 1953 E. R. KOPPEL ET AL 2,627,334
CONVEYER AND SHIFTER GUIDE MECHANISM
Filed Dec. 29, 1948 4 Sheets-Sheet 4
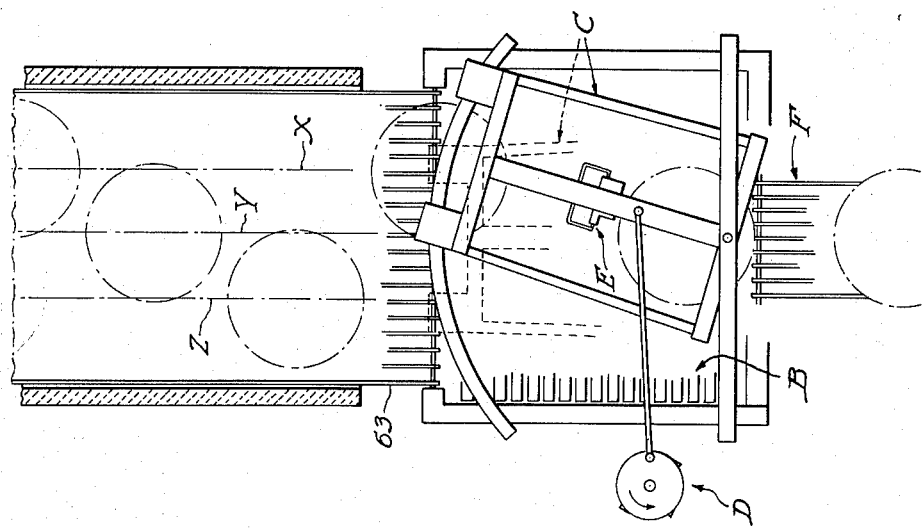
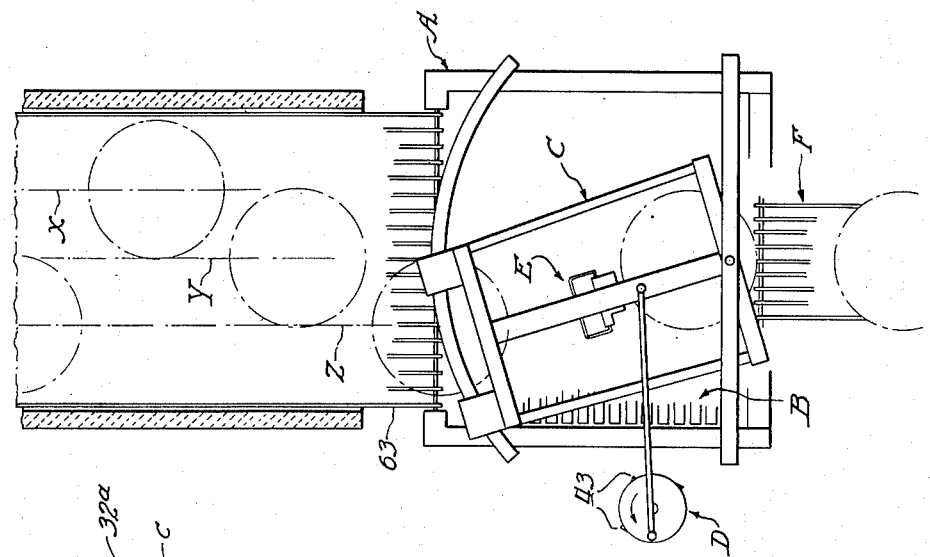
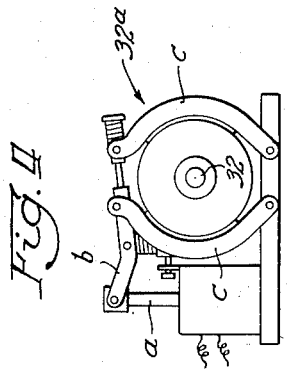
Inventors:
Ernst R. Koppel and
William J. Walters
By Edward C. Gritzbaugh
Atty.

Patented Feb. 3, 1953

2,627,334

UNITED STATES PATENT OFFICE 2,627,334

CONVEYER AND SHIFTER GUIDE MECHANISM

Ernst R. Koppel and William J. Walters, Chicago, Ill., assignors to Borg-Warner Corporation, Chicago, Ill., a corporation of Illinois Application December 29, 1948, Serial No. 67,944

15 Claims. (Cl. 198—31)

The present invention relates generally to mechanism for transferring articles from a first zone or station to a second zone or station.

More particularly, the improvements contemplated herein are directed to a transfer mechanism which is adapted to be interposed between two units or machines in a production line used in the manufacture of sheet metal articles, such for example as discs for cultivators. For the purposes of the present disclosure, the mechanism is shown as being arranged to receive the articles or discs from a press in a single row, and then transfer the articles to a heat-treating furnace into which the articles operated on by the press are delivered in a plurality of rows in staggered relation to each other.

It will be appreciated that the above suggested arrangement is merely by way of example and it does not in any way limit the invention to such a use. In fact, it is contemplated that the present transfer mechanism is well adapted to be reversely operated whereby a plurality of rows of staggered articles are received at one end of the transfer mechanism and are rearranged during transfer so that the articles are discharged in a single row.

It is therefore a principal object of the present invention to provide a transfer mechanism which is adapted to successively receive a series of articles in an initial arrangement and then to rearrange such articles in a predetermined different order for discharge from the machine, such rearrangement being performed by means of an indexed shifter assembly which is intermittently operated successive articles moving through the mechanism on a conveyor which transfers the articles from the receiving station to the delivery station. In the present mechanism each article, while traveling on the conveyor, is adapted to initiate the operation of the primary means for controlling a shifter assembly. This is accomplished by reason of the fact that the article itself comes into contact with and moves a control detent which in turn operates the master control of an indexing assembly having operative connection with a distributor or shifter frame whereby said frame is moved in a reciprocatory manner across the conveyor to define a predetermined path to be traversed by the moving article.

A further object hereof resides in the provision, in a transfer mechanism, of a conveyor which moves successive articles from end to end thereof, and, while in transit, such articles are alternately directed in a proper line of travel so that the articles will be discharged from the conveyor in a plurality of parallel rows and the articles in one row are in staggered relation to the articles in an adjacent row.

Additional objects, aims, and advantages of the invention contemplated herein will be apparent to persons skilled in the art after the construction and operation of the present mechanism are understood from the within description.

It is preferred to accomplish the numerous objects of this invention and to practice the same in substantially the manner hereinafter fully described and as more particularly pointed out in the appended claims. Reference is now made to the accompanying drawings which form a part of this specification.

In the drawings:

Fig. 1 is a top plan of an article transfer mechanism which is made in accordance with the present invention, the parts being shown in a first position;

Fig. 2 is a vertical side elevation of the structure shown in Fig. 1;

Fig. 3 is a vertical section taken transversely along the plane of line 3—3 on Fig. 2, and looking toward the delivery end of the mechanism;

Fig. 4 is a side elevation of a typical electrically released spring applied brake such as may be installed on the shaft of a motor which drives a portion of the shifter mechanism; and Figs. 5 and 6 are schematic plans, showing the relationship of the parts when the shifter assembly has defined a plurality of paths of travel of the articles through the mechanism.

The drawings are to be understood as being more or less of a diagrammatic character for the purpose of disclosing a typical or preferred embodiment of the invention contemplated herein, and in these drawings like reference characters identify the same parts in the different views.

The transfer mechanism contemplated herein includes, generally, a table A for supporting a roller type conveyor assembly B on which the articles are moved from a receiving station at one end of the table to a delivery station at the opposite end of said table. The articles begin their travel in a single row on the conveyor and during transit toward the delivery station these articles are alternately directed into different paths through the instrumentality of a shifter and guide assembly C which is selectively moved across the conveyor to different stations by an intermittently actuated indexing assembly D. The operation of this indexing assembly is predetermined in a definite sequence by a control assembly E which may be supported by the shifter and guide assembly C, said control assembly E preferably includes a detent or trip member which projects into the line of travel of the article so that it is adapted to be operated by each successive article while such article is in transit on the conveyor. It will thus be apparent that each article will predetermine its own direction or path of travel on the conveyor while such article is moving toward the delivery station of the table.

In the arrangement disclosed herein, the table A comprises upright standards 5—5 which are connected at their lower regions by horizontal longitudinally extending side rails 6—6. As seen in Fig. 2, the upper portion of the table comprises the conveyor assembly B which is in a plane inclined upwardly from its receiving end toward its delivery end, or respectively from the right portion to the left portion of Fig. 2. For the purpose of providing this inclination of the conveyor assembly, the upper regions of the standards 5—5 are connected by channel-metal side rails 7—7 which extend longitudinally of the table and support angle-metal strips 8—8 which rest upon and are suitably anchored to the horizontal upper flanges of channel rails 7—7. The top side rails 7—7 project beyond the adjacent standards 5 at the receiving end of the mechanism, and such rails 7—7 are braced by struts 9—9. Posts 10—10 of angle-metal are secured to the overhanging portions of side rail 7 and project above the conveyor assembly B where they are tied together by a cross piece 11 which defines a support for one end of the shifter assembly C. Other posts 12—12 are secured to the opposite ends of the upper side rails 7 and they also project above the conveyor assembly B and have their upper portions secured to and support an arcuate or segmental track 13. Cross piece 11 and the arcuate track 13 thus provide supporting means for the respective ends of a shifter frame assembly C which is arranged to be reciprocated toward one side and then toward the other side of the conveyor assembly.

The shifter frame assembly C is a skeleton-like structure which comprises the end pieces 14—15 that are connected by longitudinal side pieces 16—17. As seen in Fig. 1, the side pieces 16—17 are movably connected to the end pieces by bolts or rivets 18 while at their delivery ends these side rails are connected to the end piece in a manner which permits them to be adjusted toward and away from each other. For effecting this adjustment the bolts or rivets 19 pass through the ends of the rails and are inserted in any of a plurality of spaced holes 20 in the end piece 15. It will also be seen that in approximately all of their adjacent positions the side pieces 16—17 converge toward each other in a direction toward the delivery end of the conveyor B. The purpose of this adjustment is primarily to take care of discs or articles having different dimensions and particularly of a variety of widths.

At the receiving station of the mechanism, the shifter frame C has a pivotal connection as at 21 between its rearward end piece 14 and the supporting member 11 above the conveyor. Anti-friction means, preferably in the form of rollers 22, are interposed between the delivery end of the shifter frame C and the arcuate track 13. These anti-friction rollers 22 are journaled in bearings which are carried by box-like angular carrier members 23 which project out over the track from the end piece 15 of the frame for housing and journaling the anti-friction rollers 22.

The indexing assembly D provides means for reciprocating the shifter frame assembly C across the conveyor assembly B. Extending between this indexing assembly and the shifter frame C is a pitman or connecting rod 24 that is pivotally connected as at 25 to an angle-metal center sill 26 of the shifter frame C, and, the other end of pitman 24 is connected to cam means or eccentric pin 27a carried on a rotatable horizontal plate 27 positioned at one side of the table A. Said rotatable plate 27, as seen in Fig. 3, is carried on the upper end of a rotatable vertical output shaft 28 of a suitable speed-reducing or reductor unit 29 which is mounted on a shelf 30 projecting from the side of the table. Beneath the conveyor assembly there is an electric motor 31, or other prime mover, the shaft 32 of which carries twin or double sheaves 33 which are connected, by a pair of belts 34, to twin or double sheaves 35 secured to the driving or input shaft 36 of the speed reducer 29. By means of this arrangement, the circular plate or cam disc 27 is adapted to be rotated and, through the medium of the eccentric pin 27a and pitman 24, it will intermittently move the shifter frame A on its pivot 21 so that said frame may be selectively moved or swung intermittently across the conveyor assembly B to different positions with respect thereto. At the end of each such movement the shifter frame is arrested to define the path to be traversed by the article on the conveyor, as will later be described.

The control assembly E is provided for the purpose of limiting the operation of the motor 31 and the indexing assembly D whereby the shifter frame C will be intermittently moved in one direction and then in the opposite direction and preferably pause at the end of each such movement. When frame C is moved, for example, to the right in Fig. 1, it may remain in this position long enough to permit a first disc carried by the conveyor assembly B to travel in one path to the delivery end. After the first disc has been discharged, the controls are rendered active, by the movement of the second disc placed upon the conveyor, to define a second path which is to be traversed by said second or succeeding disc toward the discharge end of the conveyor. This second path is distinct from the path which has been traversed by the preceding disc.

The control assembly E is shown to include an electrical limit switch unit 37 of the snap-action type which may be conveniently carried by the center sill 26 of the shifter frame C. This limit switch 37 is operated by means of a detent 38, which may take the form of a U-shaped wire loop having the ends of its arms secured to a rock spindle 39 which has operative connection with the limit switch mechanism 37. This detent 38 hangs in a pendant manner from the shifted frame C so that a portion of it, specifically the cross arm 38a of the U-shape, lies directly in the path of movement of a disc which is traversing the table on the conveyor B. Thus said detent is moved by contact with each successive disc thereby to operate the limit switch 37 in an intermittent manner. The limit switch 37 is in circuit, through conductors 40, with a roller type snap-action limit-switch unit 41 which is controlled or set by a swinging arm 42 arranged to contact the margin or edge of the rotatable cam plate 27 of the indexing assembly D. As seen in Fig. 1 the rotatable cam plate 27 is provided with a plurality of wedge shaped projections 43 which are spaced circumferentially on the edge thereof in the manner shown in Fig. 1 and are adapted to successively engage the arm 42 to operate the snap-action limit-switch unit 41. Conductors 44 lead from switch unit 41 to the motor 31 which drives the speed reducer 29, and when the switch 41 has broken the circuit to the motor, by contact with a cam plate projection 43 the motor will be stopped to allow the shifter frame C to remain in a position to define the path of travel of the disc which has operated switch unit 37. This permits the disc which is moving through the shifter to complete its travel to the delivery end of the conveyor before the frame C is shifted to another or second position toward the opposite side of the conveyor and table. In Fig. 1, there are shown, by way of example, three positions of the shifter assembly, identified by the broken lines $x$, $y$ and $z$, for defining a plurality of distinct paths and represented by the three cam members 43 on indexing plate 27. As shown in Fig. 1, the shifter frame C is arrested at the right side of the table and conveyor by engagement of switch arm 42 with the leading cam projection 43 and the disc has been guided through the frame on path $x$. When the next disc touches the detent arm 38 the motor 31 will start and rotate circular plate 27 until the second cam 43 engages and operates switch arm 42 to brake the motor circuit and apply the brake. This positions the frame C centrally of the table and conveyor to define path $y$ for such disc. The third stop is similarly effected when the frame has moved to path $z$ and arrested by the third cam on plate 27. It will be noted there is a long gap between the last or third cam and the first cam. This permits the return of the shifter frame to its first position at the right of the table and conveyor where it again defines the path $x$. This intermittent operation is repeated by successive discs until the shifter frame has reached the left side of the conveyor assembly B.

When the circuit through the motor 31 is broken, it is desirable that the rotation of motor shaft 32 be quickly stopped so that the shifter frame will not overrun the selected position. This stoppage is effected by means of an electrically released spring-applied brake unit of any well known type, such as identified generally as 32a, which is interposed in the motor circuit. Such brake preferably includes a solenoid, the core $a$ of which is linked by an over-center toggle $b$ to magnetic brake-shoes $c$ that are adapted to grip a pulley $d$ on motor shaft 32 when the solenoid has been deenergized by the braking of the motor circuit by the snap-switch 41.

The conveyor assembly B preferably includes a plurality of driven rollers 45 having trunnions 46 which are journaled in the upstanding flanges of the angle pieces 8 of the table. These rollers 45 have sprockets 47 at or adjacent their ends, which sprockets are engaged by drive chains 48 which derive their motion from a drive sprocket 49 secured to the output shaft 50 of a speed reducer 51 which is drivingly operated by an electric motor 52, or other prime mover 52 supported on the table beneath the rollers of the conveyor B. The chains 48 engage idle sprockets 53 immediately above the drive sprocket 49 and are also engaged with sprockets 54 and 55, the later sprocket (55) being supported by a slack take-up or tensioning device 56. The driving mechanism and the conveyor are preferably continuously operated, and the conveyor moves at the same speed as a delivery mechanism F leading from a press to the receiving end of the table. This delivery mechanism comprises chains 57 engaged with sprockets 58 on a shaft 59 which extends toward one side of the table, as shown in Fig. 1 where it has a drive sprocket 60 secured to it and driven by the adjacent chain 48 which operates the rollers 45.

At the delivery end of the table there is a shaft 61 having thereon a plurality of sprockets 62 engaged with the chains 63 which receive the articles or discs from the conveyor and move them to the next or succeeding operating station of the production line. The shaft 61 extends approximately the width of the conveyor B and one end of said shaft carries a sprocket 64 which is secured to it and driven by a short chain 65, said chain in turn being engaged with sprockets 66 on a plurality of the adjacent rollers 45 of the conveyor.

In order that articles of the cultivator disc type may be guided across the conveyor B by the shifter frame C, the angle-metal side pieces 16 and 17 of said frame have widened vertical flanges 67 arranged so that their lower edges are positioned in close proximity to the conveyor and slightly above the plane of the tops of rollers 45. This arrangement insures the guiding of the articles by the shifter frame and prevents articles such as cultivator discs accidentally passing under the guides and escaping beyond the sides of the frame. Further means are provided in the form of buffers to prevent escape of the articles beneath the guides 67. These buffers comprise metal rods 68 loosely mounted at their upper end by means of eyes 69 carried by pins on the upper regions of the shifter frame side rails 16 and 17 so that the lower pendant ends of said rods lie between the rollers 45. This arrangement prevents undue wear on the guides 67 and permits any of said buffers to be readily replaced should they become damaged, or from other causes. By swingingly mounting these buffers they will readily accommodate themselves to back and forth movement of the shifter frame C when the latter is oscillated upon its pivot or fulcrum 21, and such mounting also prevents the buffer rods 68 becoming wedged between adjacent rollers of the conveyor B.

While this invention has been described in detail in its preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. An article transfer apparatus comprising, a table defined by a plurality of driven rollers arranged with their axes in a common plane which is inclined in an upward direction toward the delivery portion of said table; an arcuate track at the delivery end of said table in a plane above said rollers; a support at the receiving end of said table; a reciprocal shifter frame arranged with its end portions respectively at said track and said support, the delivery section of said frame being adapted for oscillatory movement on said track; means pivotally connecting the receiving end of said shifter frame to said support; spaced guides on said frame between which articles are adapted to travel, said guides being adjacent to but out of contact with said table rollers and extending in the general direction of travel of articles supported by said table; an indexing assembly including cam means, a pitman connecting said cam means to said frame for oscillating said frame on said pivot, and a prime mover for actuating said cam means; automatically operable control means for said indexing assembly comprising a reciprocal member actuated by contact with articles moving on said table for intermittently operating said control means; and means responsive to the intermittent operation of said control means for effecting the alternate operation and release of said indexing assembly, whereby said shifter frame is oscillated by said indexing assembly and defines a plurality of paths of travel for the articles transferred by said apparatus.

2. An article transfer apparatus comprising, conveyor means on which the articles are transferred from a receiving station to a delivery station; an elongate shifter frame arranged for reciprocal movement above said conveyor; supports for the receiving and delivery ends of said shifter frame; guide means on said frame adapted to direct articles into a plurality of paths during travel on said conveyor; an indexing assembly including an intermittently driven cam means, and an operating connection between said cam means and said frame; automatically operable control means for said indexing assembly comprising a reciprocal member actuated by contact with articles being transferred by said conveyor for intermittently operating said control means; and means responsive to the intermittent operation of said control means for effecting the alternate operation and release of said indexing assembly, whereby said shifter frame is intermittently reciprocated by said indexing assembly.

3. An article transfer apparatus for receiving a single row of articles and adapted to deliver such articles in a plurality of rows, said apparatus comprising an elongate conveyor inclined in an upward direction from its receiving portion toward its delivery portion; supports above opposite ends of said conveyor; an elongate intermittently oscillatable shifter frame approximately the length of said conveyor and arranged with its end portions on the respective supports; means pivotally connecting said shifter frame to the support at the receiving end of said conveyor; elongate spaced guides carried by said frame adjacent said conveyor and being adapted to direct the travel of articles on said conveyor into separate diverging paths extending toward the delivery portion of said conveyor; an indexing assembly including cam means, a pitman connecting said cam means to said frame for oscillating said frame on said pivot, and a prime mover for actuating said indexing means; automatically operable control means for the prime mover of said indexing assembly including a swinging member carried by said shifter frame and actuated by contact with each article moved by said conveyor for intermittently operating said control means; and means responsive to the intermittent operation of said control means for effecting the alternate operation and release of said indexing assembly.

4. An article transfer apparatus comprising, a table defined by a plurality of rollers on which articles are moved from a receiving station to a delivery station; shifter means adapted for reciprocal movement for defining a selected path of travel for each article moved on said table; an actuator having operative connection with said shifter means and adapted to effect said reciprocal movement of said shifter means; and control means for said actuator comprising an indexing assembly and a member responsive to contact with successive articles moving on said rollers for operating said indexing assembly to effect intermittent operation of said actuator for moving said shifter means to a plurality of positions between the sides of said table thereby to guide the articles toward the delivery end of the table in diverging paths to define a plurality of rows of articles delivered from said table.

5. An article transfer apparatus comprising, a table defined by a plurality of driven rollers arranged in a generally common plane for supporting and moving articles from a receiving station to a delivery station; means for delivering a single row of articles to the receiving station of said table; elongate shifter means pivoted at one end adjacent the receiving end of said table, said shifter means having upright guides extending toward the delivery end of said table and lying close to the tops of said rollers in planes intersecting the axes of said rollers; rotatable cam means having operative connection with said shifter means for moving said shifter means upon its pivot alternately in directions toward the sides of said table; and control means on said shifter means having a member operated by articles passing between said guides, said member being adapted for contact by each moving article for controlling the intermittent operation of said cam means, whereby said shifter means is moved from one side to the other of its pivot to guide the articles toward the delivery end of the table and leave the table in a plurality of rows.

6. In an apparatus for transferring articles sequentially from a first operating zone to a second operating zone comprising, a table defined by a plurality of driven rollers all arranged with their axes in a common plane which inclines in an upward direction toward the delivery end of said table; an arcuate track at the delivery end of said table above said rollers; a support at the receiving end of said table above said rollers; an elongate intermittently oscillatable shifter frame arranged with its end portions respectively on said track and said support; means pivotally connecting the receiving end of said shifter frame to said support; anti-friction means supporting the delivery end of said shifter frame on said track; spaced guides carried by said frame adjacent said table rollers, said guides extending generally in the direction of travel of the articles supported by said table; buffers between said table rollers for arresting movement of articles beneath said guides; indexing means operatively connected to said shifter frame and adapted to move said shifter frame to a plurality of positions with respect to said table for defining separate paths traversed by successive articles on said table rollers; automatically operable control means for said indexing means including a trip device projecting into the path of the articles moving between said guides, said trip device being adapted to be successively tripped by said articles to intermittently operate said control means; and means responsive to the operation of said control means for effecting the alternate operation and release of said indexing means.

7. An article transfer apparatus including a conveyor adapted to support an article and move such article from a receiving station to a delivery station; in combination with means for predetermining the path of travel of the article on said conveyor, said means comprising a reciprocal shifter guide structure adapted for intermittent movement across said conveyor to a plurality of positions thereby to direct the article in said predetermined path; means pendent from said guide structure for preventing escape of the articles beneath said guide structure; intermittently operable actuator means for moving said shifter guide structure successively to its different positions; a prime mover having driving connection with said actuator means; and control means responsive to the movement of an article traveling on said conveyor for effecting intermittent operation of said actuator means.

8. An article transfer apparatus including a conveyor adapted to support an article and move such article from a receiving station to a delivery station; in combination with means for each article predetermining its path of travel on and delivery from said conveyor, said means comprising a reciprocal shifter guide structure supported above said conveyor and adapted for intermittent movement across said conveyor to a plurality of positions which are angularly disposed with respect to each other, and said shifter in each position being effective to direct an article in its own predetermined path; intermittently operable actuator means for moving said shifter guide structure successively to its different positions; a prime mover having driving connection with said actuator means; and control means including an oscillatory member depending loosely from said shifter guide structure with its lower portion in the path of movement of an article traveling on said conveyor for effecting intermittent operation of said actuator means and thereby bodily shift the moving article to its predetermined path.

9. An article transfer apparatus including a conveyor adapted to support an article and move such article from a receiving station to a delivery station; in combination with means for predetermining the path of travel of the article on said conveyor, said means comprising an elongate reciprocal shifter guide structure adapted for intermittent movement across said conveyor to a plurality of positions thereby to direct the article in said predetermined path; intermittently operable actuator means for moving said shifter guide structure successively to its different positions; a prime mover having driving connection with said actuator means; control means responsive to the movement of an article during its travel through said shifter guide on said conveyor for effecting intermittent operation of said actuator means; and a brake adapted to arrest said prime mover at the end of each intermittent movement of said shifter guide structure.

10. An article transfer apparatus comprising a conveyor, and an elongate guide structure cooperating therewith for directing an article in a predetermined path of travel on said conveyor; in combination with operating means adapted to move said guide structure to different positions with respect to said conveyor, said operating means comprising a motor driven intermittently operable actuator assembly having a cam connected to said guide structure for successively shifting said guide structure to its different positions; a motor having driving connection with said actuator means; and control means for said motor, said control means having a pendent trip device responsive to the movement of an article during travel through said guide structure on said conveyor for effecting intermittent operation of said motor.

11. An article transfer apparatus including a conveyor, and an elongate reciprocal guide structure pivoted at an end region for swinging movement across said conveyor, in combination with an intermittently operable actuator assembly, having a driven cam, and a pitman rod connecting said cam to said guide structure for swinging said guide structure successively to its different positions in planes oblique to each other; a motor for operating said actuator means; a control assembly carried by said guide structure, said control assembly having a trip device depending from said guide structure towards said conveyor to be engaged by an article during travel through said guide structure on said conveyor for effecting said intermittent operation of said actuator means and the bodily shifting of the article while on said conveyor as to a path which is predetermined by the article; and a brake adapted to arrest said motor at the end of each intermittent movement of said guide structure.

12. An article transfer apparatus comprising an inclined transfer conveyor on which articles are moved from a receiving station to a delivery station; a track at the delivery region of said conveyor; supporting means at the receiving region of said conveyor; a reciprocal shifter frame movably supported at its delivery portion on said track; pivotal means connecting the receiving portion of said shifter frame to said supporting means; spaced guides carried by said frame between which guides the articles on said conveyor are adapted to travel and be directed by said guides into a plurality of paths leading towards the delivery station; an indexing assembly including driven cam means for oscillating said shifter frame on its pivot; control means for said indexing assembly; a trip device actuated by contact with successive articles traveling on said conveyor for intermittently operating said control means; and means responsive to the intermittent operation of said trip device for effecting alternate operation and release of said indexing assembly, each article moving between said guides being effective to predetermine its own path of travel while moving on said conveyor towards the delivery station.

13. An article transfer apparatus as defined in claim 12 wherein the conveyor is defined by a plurality of driven rollers; and buffers lying between said rollers for arresting escape of articles beneath the shifter frame guides.

14. An article transfer apparatus comprising, conveyor means for supporting and moving articles between receiving and delivery stations; a shifter frame reciprocably supported above said conveyor and movable to predetermined positions for directing articles into a plurality of paths during travel on said conveyor; an indexing assembly including intermittently driven cam means having operative connection with said shifter frame; control means for said indexing assembly having a trip device actuated in response to contact with successive articles moving on said conveyor for intermittently operating said control means; and means responsive to the intermittent operation of said control means for effecting the alternate operation and release of said indexing assembly to intermittently move said shifter frame into positions which successively define each of the aforesaid plurality of paths traversed by the articles on said conveyor means.

15. An article transfer apparatus as defined in claim 14, wherein the conveyor means comprise a plurality of driven rollers arranged in a plane inclined towards the delivery station; and buffer roads pendently carried by said shifter frame and arranged with their lower portions between said conveyor rollers for arresting escape of articles sidewise beneath said shifter frame.

ERNST R. KOPPEL.
WILLIAM J. WALTERS.

REFERENCES CITED

The following references are of record in the file of this patent:

UNITED STATES PATENTS

| Number | Name | Date |
|---|---|---|
| 1,236,389 | Augensen | Aug. 14, 1917 |
| 1,516,409 | Scott | Nov. 18, 1924 |
| 1,534,334 | Stutsman | Apr. 21, 1925 |
| 1,712,872 | Cowley | May 14, 1929 |
| 1,747,465 | Cameron | Feb. 18, 1930 |
| 1,862,619 | Fox | June 14, 1932 |
| 2,371,419 | Bergmann | Mar. 13, 1945 |
| 2,426,505 | Hill | Aug. 26, 1947 |
| 2,465,690 | Lyon | Mar. 29, 1949 |